US009317976B2

(12) United States Patent
Andrews et al.

(10) Patent No.: US 9,317,976 B2
(45) Date of Patent: Apr. 19, 2016

(54) FARE COLLECTION USING WIRELESS BEACONS

(71) Applicant: CUBIC CORPORATION, San Diego, CA (US)

(72) Inventors: David Andrews, Hampstead, NC (US); Paul Monk, Horley (GB); Pradip Mistry, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/526,963

(22) Filed: Oct. 29, 2014

(65) Prior Publication Data

US 2015/0120558 A1    Apr. 30, 2015

Related U.S. Application Data

(60) Provisional application No. 61/897,002, filed on Oct. 29, 2013.

(51) Int. Cl.
*G06Q 40/02* (2012.01)
*G07B 15/00* (2011.01)
(Continued)

(52) U.S. Cl.
CPC .............. *G07B 15/00* (2013.01); *G06Q 20/327* (2013.01); *G06Q 20/40* (2013.01); *G07C 9/00571* (2013.01); *G07C 2009/00373* (2013.01); *G07C 2009/00769* (2013.01)

(58) Field of Classification Search
CPC .................... G06Q 20/40145; G06Q 2240/00; G06Q 20/3224; G06Q 20/327; G06Q 30/0261; G06Q 30/0267; G06Q 50/30; G06Q 20/3278; H04W 84/005; H04W 84/12; H04W 84/00512; H04W 24/00; H04W 4/02; H04W 24/08; H04L 43/0811; H04L 43/0876; H04L 63/08; H04L 63/107; H04L 2012/40247; H04L 67/18; G01S 1/68; G01S 5/02; G07C 9/00; G07C 9/00111; G07C 9/02; G07B 15/063; G07B 15/00; G07B 15/02; G07B 15/06; G08G 1/017; G08G 1/096741; G08G 1/096758; G08G 1/096775; G08G 1/086783; G08G 1/149; G08G 1/207; G01C 21/34
See application file for complete search history.

(56) References Cited

U.S. PATENT DOCUMENTS 6,490,443 B1 * 12/2002 Freeny, Jr. .............. G06Q 20/32
455/406
2001/0007815 A1 * 7/2001 Philipsson ...................... 455/41
(Continued)

FOREIGN PATENT DOCUMENTS

WO         01/45319 A1    6/2001
WO     2009/152628 A1    12/2009

OTHER PUBLICATIONS

ISR/WO mailed on Feb. 18, 2015 for International Patent Application PCT/US2014/062918 filed on Oct. 29, 2014, all pages.

*Primary Examiner* — Kimberly Berona
*Assistant Examiner* — Carol See
(74) *Attorney, Agent, or Firm* — Kilpatrick Townsend & Stockton LLP

(57) ABSTRACT

Systems and techniques are presented for processing a user through a paid entry gate using a mobile device. The mobile device receives a beacon packet from a first wireless beacon and wakes up an application. The application wakes up by transitioning to an active or background execution state. The application transmits validation data to a computer server system and the computer server system validates an account of the user. The mobile device receives a beacon packet including a gate identifier that is a unique identification of the paid entry gate from a second wireless beacon and transmits the gate identifier to the computer server system. The computer server system receives the gate identifier, debits the account of the user, and transmits a signal to a gate entry device associated with the gate identifier to grant the user passage through the paid entry gate.

20 Claims, 3 Drawing Sheets

(51) Int. Cl.
  *G06Q 20/32*   (2012.01)
  *G06Q 20/40*   (2012.01)
  *G07C 9/00*    (2006.01)

(56) References Cited

U.S. PATENT DOCUMENTS

| | | |
|---|---|---|
| 2002/0090930 A1 | 7/2002 | Fujiwara et al. |
| 2002/0145542 A1* | 10/2002 | Yamashita ........... G07B 15/063 340/935 |
| 2007/0200665 A1* | 8/2007 | Studerus ..................... 340/5.61 |
| 2010/0113013 A1* | 5/2010 | Karabinis ........ G06Q 30/06001 455/426.1 |
| 2011/0035604 A1 | 2/2011 | Habraken |
| 2013/0013413 A1* | 1/2013 | McDaniel ................. 705/14.64 |
| 2013/0018705 A1* | 1/2013 | Heath et al. .................... 705/13 |
| 2013/0176107 A1 | 7/2013 | Dumas et al. |
| 2013/0198019 A1* | 8/2013 | Smith ............................. 705/17 |
| 2013/0257658 A1* | 10/2013 | Hall .............................. 342/451 |
| 2014/0025444 A1* | 1/2014 | Willis ............................. 705/13 |

\* cited by examiner

FARE COLLECTION USING WIRELESS BEACONS

CROSS-REFERENCES TO RELATED APPLICATIONS

This application claims the benefit of U.S. Provisional Patent Application No. 61/897,002, filed Oct. 29, 2013, entitled "TRANSIT FARE PAYMENT USING A MOBILE INSTRUMENT BLUETOOTH ENABLED APPLICATION," the entire disclosure of which is hereby incorporated by reference for all purposes.

BACKGROUND

1. The Field of the Invention

The present invention generally relates to paid entry gates. More specifically, the present invention relates to paid entry gates that use wireless beacons for payment collection.

2. The Relevant Technology

Turnstiles are typically used at entry gates of restricted areas to process users through the gates. The turnstile ensures that users can only pass through the gate in one direction and only one user can pass through at a time. A payment device can be used in conjunction with a turnstile to automate the fee collection and access granting processes. For example, a payment device that accepts coins, tokens, tickets, or cards can be placed next to the turnstile and can operate the turnstile to grant passage only if a valid payment has been received.

Turnstiles with payment devices can be used in a wide variety of settings to restrict access to paying customers. While turnstiles are most commonly found in mass transit systems, they can also be utilized at stadiums and sporting events, amusement parks and attractions, or any other setting where payment is collected in exchange for access to a restricted area.

BRIEF SUMMARY

In one embodiment, a system for processing a user through a paid entry gate using a mobile device is presented. The system includes a first wireless beacon, a second wireless beacon, an application executed by the mobile device, and a computer server system. The first wireless beacon is configured to wirelessly transmit a first beacon packet in a first area. The second wireless beacon is configured to wirelessly transmit a second beacon packet in a second area that is closer to the paid entry gate than the first area. The second beacon packet includes a gate identifier that is a unique identification of the paid entry gate.

The application executed by the mobile device is configured to wake up in response to the mobile device receiving the first beacon packet from the first wireless beacon. The application wakes up by transitioning to an active or background execution state. The application transmits validation data to a computer server system after waking up. The application receives the second beacon packet including the gate identifier from the second wireless beacon and transmits the gate identifier to the computer server system. The computer server system is configured to receive the validation data, validate an account of the user, receive the gate identifier, and debit the account of the user. The computer server system is further configured to transmit a signal to a gate entry device associated with the gate identifier to grant the user passage through the paid entry gate.

In another embodiment, a method for processing a user through a paid entry gate using a mobile device is presented. The method includes transmitting a first beacon packet from a first wireless beacon to the mobile device in a first area. An account of the user is validated after transmitting the first beacon packet. A second beacon packet is transmitted from a second wireless beacon to the mobile device in a second area that is closer to the paid entry gate than the first area. A transaction is conducted after transmitting the second beacon packet. The transaction includes debiting the account of the user and granting passage through the paid entry gate.

In a further embodiment, a non-transitory computer-readable medium is presented. The non-transitory computer-readable medium has instructions stored therein, which when executed cause a computer to perform a set of operations including receiving a first beacon packet from a first wireless beacon and validating an account of a user in response to receiving the first beacon packet. Further operations include receiving a second beacon packet from a second wireless beacon, debiting the account of the user in response to receiving the second beacon packet, and transmitting a signal wirelessly to a gate entry device that causes the gate entry device to grant passage through a paid entry gate.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to effect such feature, structure, or characteristic in connection with other embodiments whether or not explicitly described.

Gate entry devices such as turnstiles can be placed at entry gates for controlling access to restricted areas. A payment device such as a coin collector or card reader can be used in conjunction with a gate entry device to effectively consolidate the fee collection and access granting processes to a single location. This can save time for users that are seeking access to the restricted area by eliminating the need to go to a separate location, such as a ticket office, to make payment. However, the single point of transaction can also create a bottleneck in the processing of users through the gate. For example, a user that does not have payment ready at the gate can hold up all of the users following behind. Furthermore, some forms of payment, such as credit cards, can take a relatively long time to validate and process.

Embodiments of the present invention use wireless beacons for payment collection to increase the processing rate of users going through a paid entry gate. A long range wireless beacon transmits a beacon packet in an area that is relatively distant from the entry gate and a short range wireless beacon transmits a beacon packet in an area that is relatively close to the entry gate. A mobile device receives the beacon packet from the long range wireless beacon and begins the validation process for an account that is used for payment. When the beacon packet from the short range wireless beacon is received, the account is debited and passage is granted through the paid entry gate.

Figure 1:
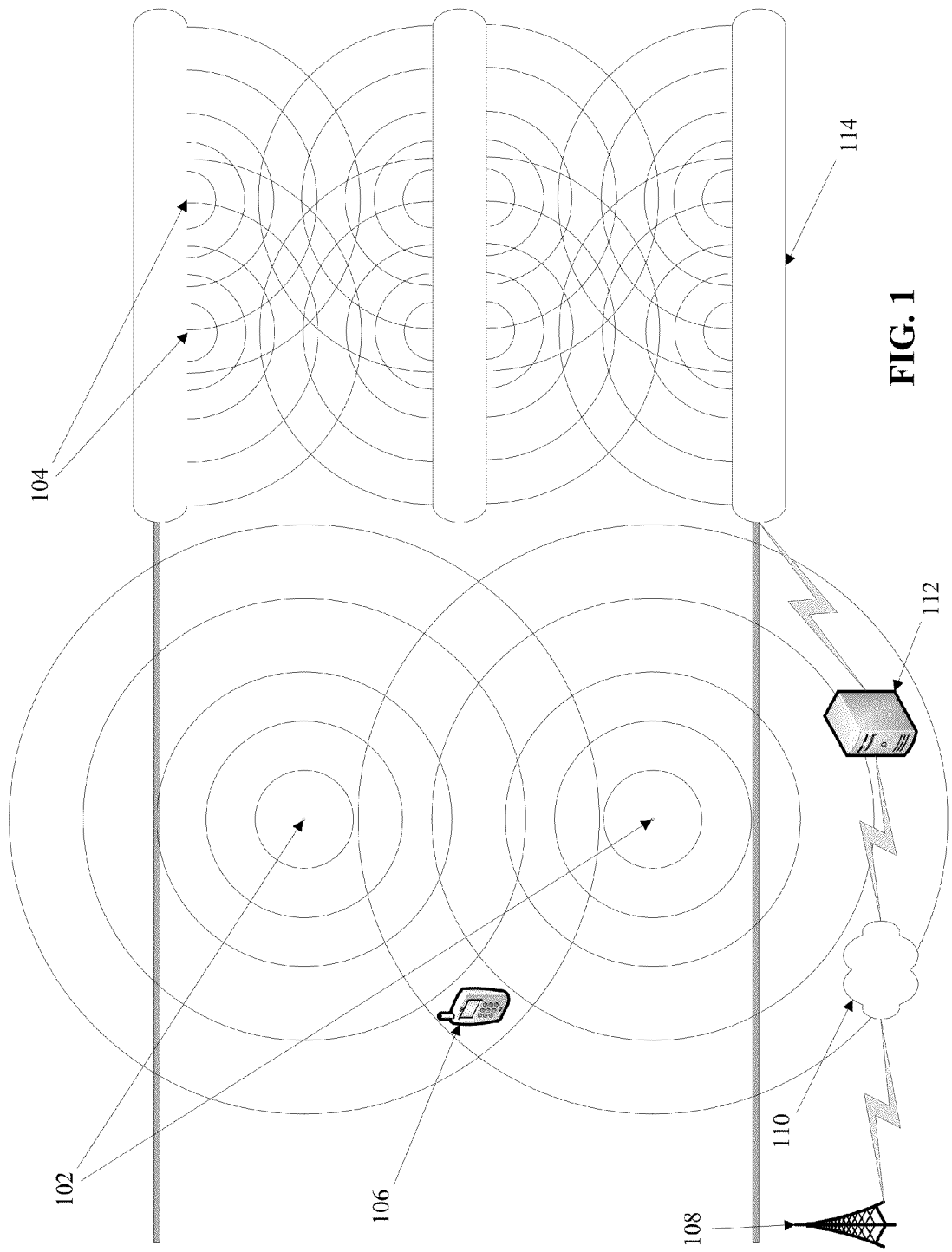
FIG. 1 is an example environment within which one embodiment of a system that uses wireless beacons to collect payment at entry gates can be implemented.

FIG. 1 is an example environment within which one embodiment of a system that uses wireless beacons to collect payment at entry gates can be implemented. The environment depicted in this figure represents a gate or entrance to a restricted area that requires payment for access. For example, the depicted environment can be the ticketing and entrance area for a public transit system, such as a subway or bus transit system, a stadium or theme park, or any other setting in which payment is collected in exchange for access to a restricted area.

In this embodiment, the system includes two long range wireless beacons 102 placed in an area that users would go through to reach the entry gate. Long range wireless beacons 102 are equipped with omnidirectional antennas and the wireless signals from beacons 102 cover a relatively large area. While only two long range wireless beacons 102 are depicted in FIG. 1 for the sake of clarity, the system can include any number of long range wireless beacons 102.

The system also includes eight short range wireless beacons 104 placed at the entry gate, although only two of the eight beacons are labeled in FIG. 1 for the sake of clarity. In this embodiment, radio frequency (RF) blocking/shielding plates are placed behind short range wireless beacons 104 so that the wireless signals generated by beacons 104 have limited directions of dispersion. In other embodiments, short range wireless beacons 104 can be equipped with directional antennas that disperse wireless signals in a narrow beam or dipole antennas that disperse wireless signals in a figure-eight pattern.

In this embodiment, the wireless signals from long range wireless beacons 102 cover a greater area than short range wireless beacons 104. However, this is not necessary in other embodiments. Rather, the terms "long range" and "short range" refers to the relative distance from the entry gate that the signals from beacons 102 and 104 can reach. Thus, long range wireless beacons 102 transmit beacon packets to an area that is relatively distant from the entry gate and short range wireless beacons 104 transmit beacon packets to an area that is relatively close to the entry gate. Beacons 102 and 104 can be Bluetooth low energy (BLE) beacons or use other wireless communication technologies such as Wi-Fi. In one embodiment, beacons 102 and 104 are BLE beacons that transmit beacon packets in advertising mode and use a traditional (non-advertising mode) Bluetooth connection for other types of data exchange, such as time synchronization. To save in equipment costs, long range wireless beacons 102 can transmit at a higher power level than short range wireless beacons 104 so that the beacon packets can be received at farther distances from the beacons 102.

Mobile device 106 can receive the beacon packets that are transmitted by beacons 102 and 104. Each beacon packet can include some form of an identifier that uniquely identifies the transmitting beacon so that the beacon packets transmitted by long range wireless beacons 102 can be distinguished from the beacon packets transmitted by short range wireless beacons 104. Additionally, to prevent pranksters and hackers from sabotaging the system, the beacon packets can be encrypted by a message authentication code (MAC) and each beacon packet can include the MAC. The encryption can be a public key encryption so that everyone can verify the authenticity of the beacon packets, but only the beacons can generate the encrypted beacon packets. To prevent re-play attacks, the beacon packets can further include time and date stamps, so that captured messages are not valid if retransmitted at a later time.

Mobile device 106 also communicates with computer server system 112. In this embodiment, communications are established via cell tower 108 and internet 110 using wireless telecommunications protocols such as 3G or 4G. In other embodiments, mobile device 106 can communicate with computer server system 112 via a router and a private network using protocols such as Wi-Fi.

Computer server system 112 further communicates with gate entry device 114, which can be a turnstile or some other form of access control device. In this embodiment, gate entry device 114 is an optical turnstile that uses optical sensors, such as infrared sensors, to detect users passing through the gate. When valid payment is received, gate entry device 114 can grant a user passage through the entry gate by generating some form of sensory notification, such as a visual notification in the form of a green colored light or an audible notification in the form of speech or sound. On the other hand, if the sensors detect that a person has gone through the entry gate and payment has not been received, a red colored light or an alarm can be generated to notify the user or nearby authorities.

To collect payment, mobile device 106 can start validating an account when a beacon packet from a long range wireless beacon 102 is received. Validating the account can include transmitting an authorization request to a payment processor for credit card or debit card accounts or checking the balance of the account. Mobile device 106 can perform the validation itself or transmit validation data to computer server system 112 that causes computer server system 112 to perform the validation. By starting the validation process before the user reaches the gate, there is less delay at the gate and the user can be quickly processed through the gate. When the user reaches the gate and a beacon packet from short range wireless beacon 104 is received, the account can be debited and a signal can be transmitted to gate entry device 114 to grant passage to the user. Additional details for collecting payment are described herein below with reference to FIG. 2.

Figure 2:
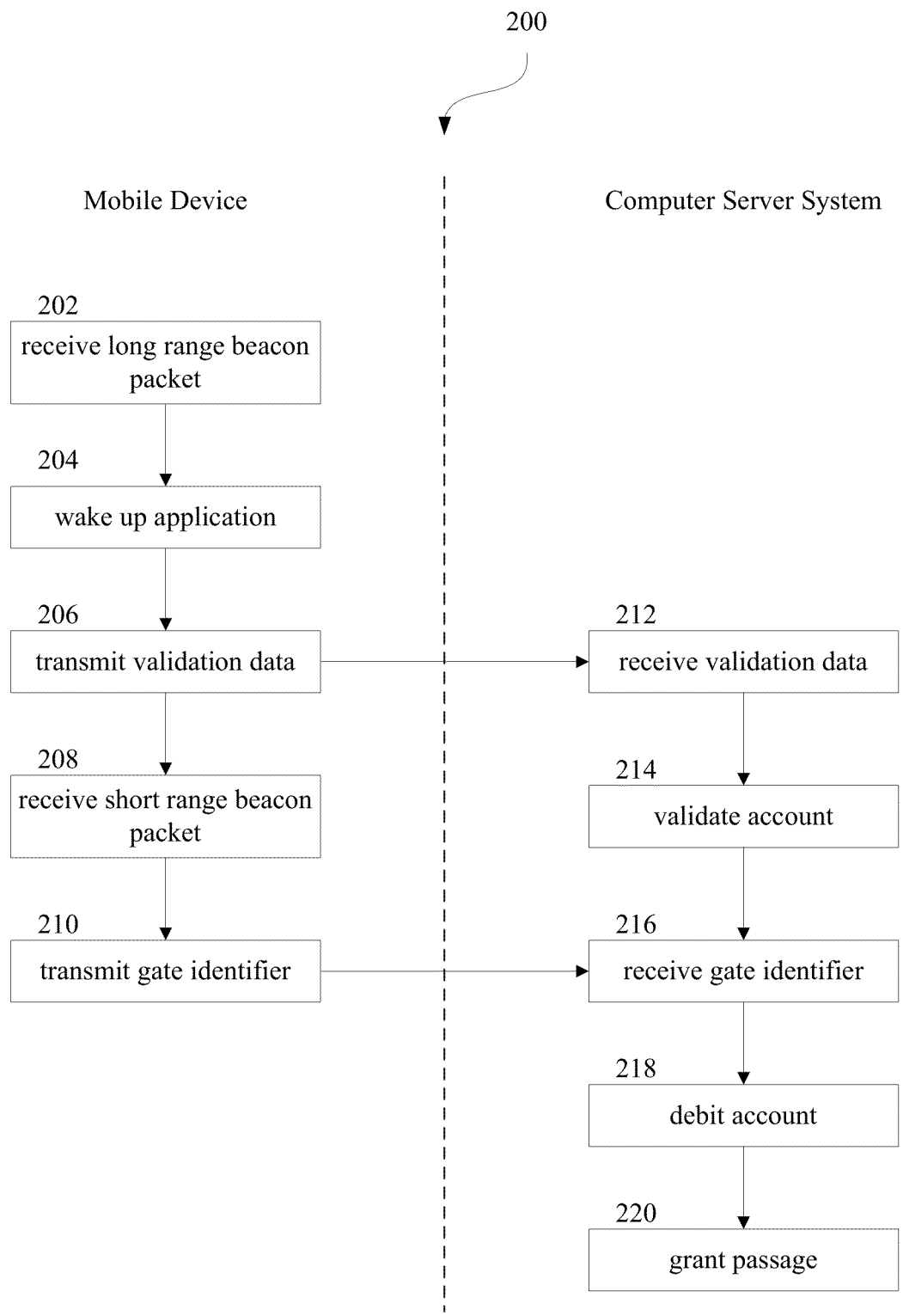
FIG. 2 is an interaction flowchart of one embodiment of a process for collecting payment at an entry gate using wireless beacons.

FIG. 2 is an interaction flowchart of one embodiment of a process 200 for collecting payment at an entry gate using wireless beacons. This flowchart illustrates the interactions between a mobile device and a computer server system.

At block 202, the mobile device receives a long range beacon packet from a long range wireless beacon. In response to receiving the long range beacon packet, an application is woken up at block 204. In one embodiment, the application registers the identifier of the long range wireless beacons with the operating system of the mobile device and the operating system wakes up the application when the long range beacon packet is received. The operating system can wake up the application by launching the application into a background execution state if the application is not running or suspended when the long range beacon packet is received. The application can then generate a notification to the user while executing in the background by, for example, vibrating the mobile device, generating a sound, activating a light source, or displaying a message and the user can launch the application's user interface after receiving the notification. In another embodiment, the application is executing in the background and listening for the long range beacon packet. The application wakes up after receiving the long range beacon packet by launching the user interface.

In one embodiment, after the application is woken, the user interface can display a dialogue box or message that queries the user to authorize the transaction. The user can authorize the transaction by selecting a button, entering a password, or using biometric information such as a fingerprint if the mobile device is equipped with biometric sensors. If the user authorizes the transaction, validation data is transmitted to the computer server system at block 206. The validation data can include account information such as the account number, expiration date, and billing address. The validation data can also include transaction information such as the transaction amount and the location, venue, or station that the mobile device is located at. The mobile device can determine this information from data that is contained in the beacon packet or through other sources such as a global positioning system or the internet.

In other embodiments, the application can transmit the validation data without querying the user. For example, if the application is running in the background or launched into the background when the long range beacon packet is received, the application can transmit validation data for a default payment account that was preselected by the user to the computer server system without displaying the user interface. The user interface can allow the user to select the default payment account from several accounts stored on the mobile device or enter the account information for the default payment account, which can be, for example, a credit card, bank account, or transit account.

The default payment account information can also be stored at the computer server system. In one embodiment, the default account information is stored in a database at the computer server system and the database is indexed by a unique identification of the user or the mobile device. The mobile device can transmit this unique identification as the validation data to the computer server system and the computer sever system can retrieve the default account information for validation by querying the database using the unique identification.

At block 208, the mobile device receives a short range beacon packet from a short range wireless beacon. In this embodiment, the short range beacon packet includes a gate identifier that indicates an entry gate that the short range wireless beacon is located at. After receiving the short range beacon packet including the gate identifier, the mobile device transmits the gate identifier to the computer server system at block 210.

Referring now to the computer server system, at block 212, the validation data is received from the mobile device. In response to receiving the validation data, the computer server system validates the account that will be used for payment at block 214. If the account is a credit card or debit card account, validating the account can include transmitting an authorization request for the account to a payment processor. If the account is maintained by the computer server system or the computer server system has direct access to the account, validating the account can include checking the balance of the account to ensure there are sufficient funds for payment. If the authorization request is denied or if the account does not have sufficient funds for payment, the computer server system can transmit a notification to the mobile device and the mobile device can notify the user by, for example, vibrating, generating a sound, activating a light source, or displaying a message.

At block 216, the computer server system receives the gate identifier from the mobile device. In response to receiving the gate identifier, the computer server system debits the account at block 218. If the account is a credit card or debit card account, the transaction for debiting the account can be stored by the computer server system until the end of day or some other time when all stored transactions are transmitted to the payment processor in a batch. In other embodiments, the account can be debited after validating the account at block 214 and before the gate identifier is received at block 216. At block 220, the user is granted passage through the entry gate by transmitting a signal to the entry gate device that is associated with the gate identifier. After processing the user through the entry gate, the application executed on the mobile device can collect commercial coupons of interest to the device owner using longer range Bluetooth communications and knowledge of the users history including purchase history and prior coupon use history.

In other embodiments, variations can be made to process 200 while still achieving the same advantages. For example, instead of receiving the short range beacon packet at block 208, the mobile device can transmit a beacon packet (e.g., BLE packet transmitted in advertising mode) or some other wireless signal (e.g., traditional Bluetooth packet or BLE packet transmitted in non-advertising mode) that includes the unique identifier of the user or the mobile device. The unique identifier is also transmitted to the computer server system and after the computer server system validates the account or debits the account, the computer server system can transmit the unique identifier to the gate entry device. The gate entry device also includes a wireless receiver. When the beacon packet or wireless signal transmitted by the mobile device is received by the gate entry device, passage can be granted based on a match between the identifier received from the mobile device and the identifier received from the computer server system.

In a further embodiment, the process for collecting payment can be performed without the computer server system. For example, the mobile device can perform the validation of the account by transmitting the authorization request to the payment processor or checking the account balance if the account is directly accessible (e.g., the account is maintained on the computer server system and the application executed on the mobile device can access the account through an application programming interface) or maintained on the mobile device. After validating the account, the mobile device can transmit a beacon packet or wireless signal that includes a special code or some other data that causes the gate entry device to grant passage when received. For example, the beacon packet or wireless signal can include a unique identification of the gate that the user is entering to ensure only that gate grants entry.

Figure 3:
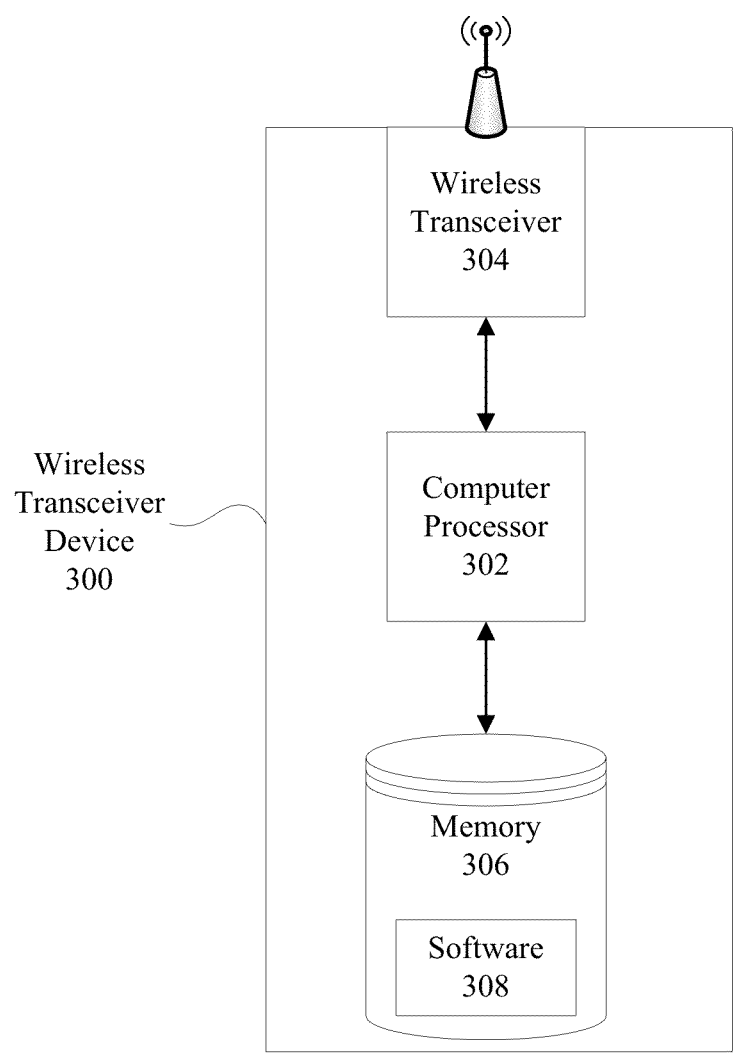
FIG. 3 is a block diagram of one embodiment of a wireless transceiver device that can be used in a system that uses wireless beacons to collect payment at entry gates.

FIG. 3 is a block diagram of one embodiment of a wireless transceiver device 300 that can be used in a system that uses wireless beacons to collect payment at entry gates. Wireless transceiver device 300 can be a mobile device or a wireless beacon. Wireless transceiver device 300 includes a computer processor 302, a wireless transceiver 304, and a memory module 306. Memory module 306 can be any non-transitory machine-readable media, such as optical disks or flash memory devices. Software 308 is stored in memory module 306 and provides instructions to computer processor 302 according to any of the embodiments described herein.

Computer processor 302 utilizes wireless transceiver 304 to communicate, by transmitting and receiving data packets, with other wireless transceiver devices. It will be understood that the wireless transceiver device 300 can include additional components not shown in the figure. For example, wireless transceiver device 300 can include additional wireless transceivers that utilize different technologies for wireless communication or the different technologies can be combined into a single wireless transceiver. Different wireless communication technologies include Bluetooth, BLE, Wi-Fi, near field communication (NFC), and 3G/4G mobile communication. Additionally or alternatively, different embodiments may combine, separate, omit, and/or rearrange the components shown in FIG. 3.

Although embodiments provided herein describe the use of Bluetooth, and in particular BLE, embodiments are not so limited. Concepts provided herein may be extended to other wireless technologies. Furthermore, embodiments herein can be implemented in a wide range of wireless devices and/or work with a wide range of software applications and/or operating systems.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for processing a user through a paid entry gate using a mobile device, the system comprising:
   a first wireless beacon that wirelessly transmits a first beacon packet in a first area;
   a second wireless beacon that wirelessly transmits a second beacon packet in a second area that is closer to the paid entry gate than the first area, the second beacon packet including a gate identifier that uniquely identifies the paid entry gate from a plurality of gates;
   a mobile device executing an application, the application performing the steps of:
   waking up in response to the mobile device receiving the first beacon packet from the first wireless beacon, wherein the application wakes up by transitioning to an active or background execution state,
   transmitting validation data to a computer server system after waking up and prior to receiving the second beacon packet, the validation data including account information for an account,
   receiving the second beacon packet including the gate identifier from the second wireless beacon, and
   transmitting the gate identifier to the computer server system; and
   the computer server system performing the steps of:
   receiving the validation data,
   validating the account based on the validation data,
   receiving the gate identifier,
   debiting the account, and
   transmitting a signal to a gate entry device associated with the gate identifier to grant the user passage through the paid entry gate.

2. The system of claim 1, further comprising:
   the gate entry device that activates a green colored light source in response to receiving the signal from the computer server system.

3. The system of claim 2, wherein the gate entry device includes an infrared sensor, and further performs the steps of:
   sensing a second user passing through the paid entry gate,
   determining that a second signal has not been received from the computer server system, and
   activating at least one of a red colored light source and a speaker that generates an alarm in response to determining that the second signal has not been received.

4. The system of claim 1, wherein the first wireless beacon and the second wireless beacon are Bluetooth low energy beacons.

5. The system of claim 1, wherein the application further performs the steps of:
   querying the user to authorize a transaction after waking up, and receiving user input in response to the query,
   wherein the application transmits the validation data to the computer server system based on the user input.

6. The system of claim 1, wherein the first wireless beacon transmits at a greater transmission power level than the second wireless beacon.

7. The system of claim 1, wherein the second wireless beacon transmits the second beacon packet in a limited direction.

8. A method for processing a user through a paid entry gate using a mobile device, the method comprising:
   transmitting a first beacon packet from a first wireless beacon to the mobile device in a first area;
   receiving validation information from the mobile device after transmitting the first beacon packet and prior to transmitting a second beacon packet;
   validating an account based on the validation information;
   transmitting the second beacon packet from a second wireless beacon to the mobile device in a second area that is closer to the paid entry gate than the first area, the second beacon packet including a gate identifier that uniquely identifies the paid entry gate from a plurality of gates; and
   conducting a transaction after transmitting the second beacon packet, the transaction including debiting the account and granting passage through the paid entry gate.

9. The method of claim 8, wherein validating the account includes transmitting an authorization request to a payment processor.

10. The method of claim 8, wherein validating the account includes checking a balance of the account.

11. The method of claim 8, wherein the first beacon packet is encrypted.

12. The method of claim 11, wherein the first beacon packet is encrypted using a public key encryption.

13. The method of claim 11, wherein the first beacon packet includes a message authentication code.

14. The method of claim 8, wherein the first beacon packet includes a time of day and a date.

15. A non-transitory computer-readable medium, having instructions stored therein, which when executed cause a computer to perform a set of operations comprising:
   receiving a first beacon packet from a first wireless beacon;
   transmitting validation data to a computer server system in response to receiving the first beacon packet and prior to receiving a second beacon packet, the validation information including account information for an account;
   receiving the second beacon packet from a second wireless beacon, the second beacon packet including a gate identifier that uniquely identifies a paid entry gate from a plurality of gates; and
   transmitting the gate identifier to the computer server system in response to receiving the second beacon packet such that the account is debited and the user is granted passage through the paid entry gate.

16. The non-transitory computer-readable medium of claim 15, having further instructions stored therein, which when executed cause the computer to perform a set of operations comprising:
   displaying a coupon.

17. The non-transitory computer-readable medium of claim 15, having further instructions stored therein, which when executed cause the computer to perform a set of operations comprising:
   receiving user input that includes account information for the account.

18. The non-transitory computer-readable medium of claim 15, having further instructions stored therein, which when executed cause the computer to perform a set of operations comprising:
   displaying a plurality of accounts that are stored on a mobile device; and
   receiving user selection of the account from the plurality of accounts.

19. The non-transitory computer-readable medium of claim 15, having further instructions stored therein, which when executed cause the computer to perform a set of operations comprising:
   querying a user to authorize a transaction;
   receiving biometric data from the user in response to the query; and
   authorizing the transaction based on the biometric data.

20. The non-transitory computer-readable medium of claim 15, wherein a signal that causes the gate entry device to grant passage to the user is transmitted from the computer server system via a Bluetooth protocol.

* * * * *